(12) United States Patent
Lotspiech et al.

(10) Patent No.: US 6,888,944 B2
(45) Date of Patent: May 3, 2005

(54) METHOD FOR ASSIGNING ENCRYPTION KEYS

(75) Inventors: Jeffrey Bruce Lotspiech, San Jose, CA (US); Dalit Naor, Palo Alto, CA (US); Sigfredo Ismael Nin, Morgan Hill, CA (US); Florian Pestoni, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 913 days.

(21) Appl. No.: 09/777,506

(22) Filed: Feb. 5, 2001

(65) Prior Publication Data

US 2002/0106087 A1 Aug. 8, 2002

Related U.S. Application Data

(63) Continuation-in-part of application No. 09/065,938, filed on Apr. 24, 1998, now Pat. No. 6,118,873.

(51) Int. Cl.$^7$ .............................................. H04N 7/167
(52) U.S. Cl. ...................... 380/278; 380/269; 380/286; 380/44; 380/45; 380/30; 713/200; 713/201; 714/777; 714/784
(58) Field of Search ................................ 380/269, 280, 380/30, 44–45, 28; 713/200–201; 714/777, 784, 762, 804, 781

(56) References Cited

U.S. PATENT DOCUMENTS 4,512,020 A * 4/1985 Krol et al. .................. 714/781
5,200,999 A * 4/1993 Matyas et al. ............... 380/277
5,592,552 A   1/1997 Fiat .............................. 380/21
6,145,111 A * 11/2000 Crozier et al. .............. 714/755
2003/0223579 A1 * 12/2003 Kanter et al. ................. 380/28

OTHER PUBLICATIONS

Digital COmmunications Fundamental & Applications (Bernard Sklar, 1988).*

* cited by examiner

*Primary Examiner*—Ayaz Sheikh
*Assistant Examiner*—Longbit Chai
(74) *Attorney, Agent, or Firm*—John L. Rogitz

(57) ABSTRACT

Sets of encryption keys useful by devices for decrypting encrypted content are defined using an error-correcting code such as a Reed-Solomon code to define vectors of length "n" over an alphabet of (0, . . . , N−1), wherein "n" is the number of columns in a key matrix and "N" is the number of rows in the matrix. Each vector represents a set of keys that can be assigned to a device. With this invention, overlap between sets of keys can be minimized to minimize the possibility that the key set of an innocent device might be inadvertently revoked when the key set of a compromised device is revoked. Also, only the generating matrix of the error-correcting code and the index of one set of keys need be stored in memory, since all previously defined key sets can be regenerated if need be from just the generating matrix and index.

24 Claims, 1 Drawing Sheet

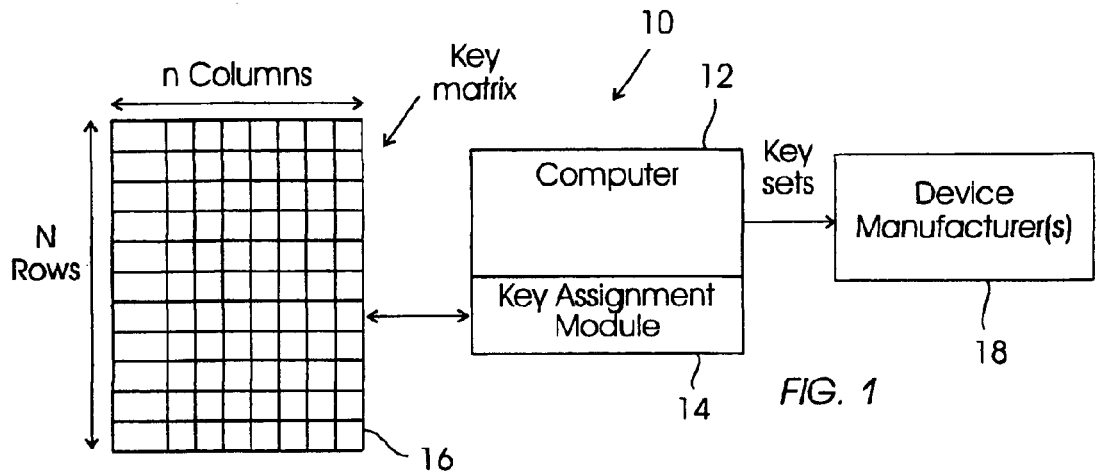
FIG. 1
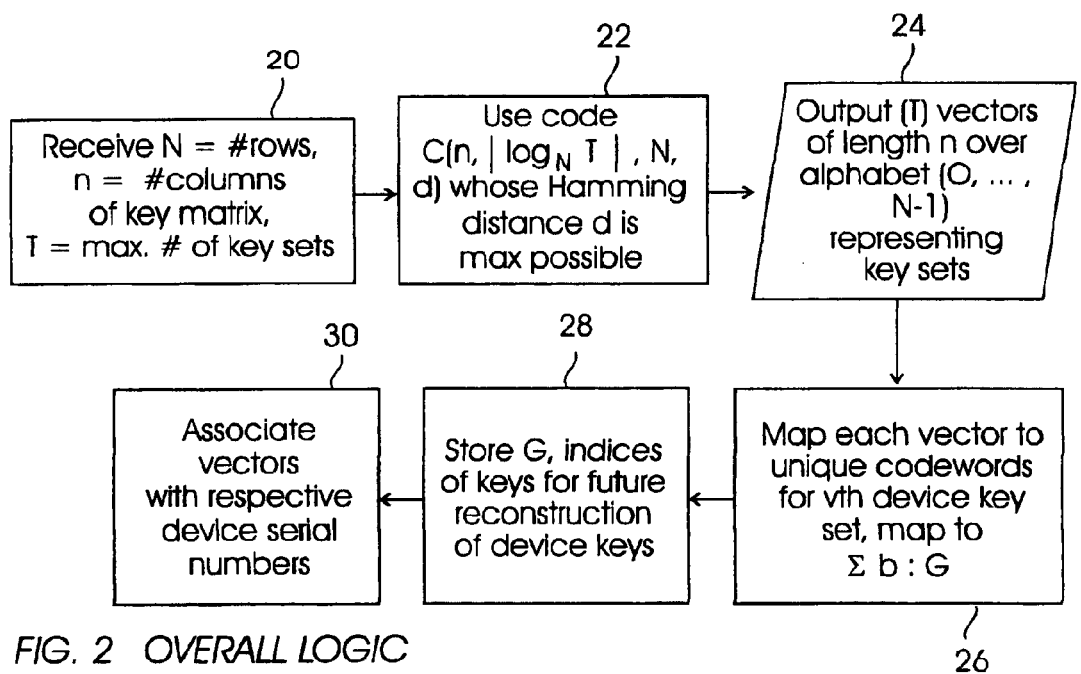
FIG. 2 OVERALL LOGIC
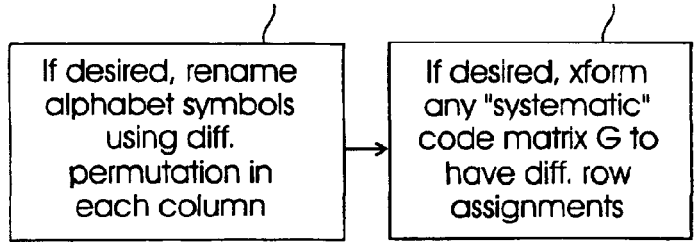
FIG. 3 OPTIONAL ENHANCEMENTS

METHOD FOR ASSIGNING ENCRYPTION KEYS

PRIORITY CLAIM

This application is related to co-pending U.S. patent application Ser. No. 09/379,049, filed Aug. 23, 1999, which is a continuation-in-part of U.S. patent application filed Apr. 24, 1998, now U.S. Pat. No. 6,118,873. Priority is claimed from both of the above documents, both of which are incorporated herein by reference.

BACKGROUND OF THE INVENTION

1. Field of the Invention

The present invention relates generally to broadcast data encryption that uses encryption keys.

2. Description of the Related Art

The above-referenced applications disclose a system for encrypting publicly sold music, videos, and other content. As set forth therein, only authorized player-recorders can play and/or copy the content and only in accordance with rules established by the vendor of the content. In this way, pirated copies of content, which currently cost content providers billions of dollars each year, can be prevented.

In the encryption method disclosed in the above-referenced patent, authorized player-recorders are issued software-implemented device keys from a matrix of device keys. Specifically, the matrix of device keys includes plural rows and columns, and each authorized player-recorder is issued a single key from each column. Each column might contain many thousands of rows. The keys can be issued simultaneously with each other or over time, but in any event, no player-recorder is supposed to have more than one device key per column of the matrix. Although two devices might share the same key from the same column, the chances that any two devices share exactly the same set keys from all the columns of the matrix are very small when keys are randomly assigned.

Using any one of its device keys, an authorized player-recorder can decrypt a media key that in turn can be used to decrypt content that is contained on, e.g., a disk and that has been encrypted using the media key. Because the player-recorder is an authorized device that is programmed to follow content protection rules, it then plays/copies the content in accordance with predefined rules that protect copyright owners' rights in digitized, publicly sold content.

In the event that a device (and its keys) becomes compromised, deliberately or by mistake, it is necessary to revoke the keys of that device. The above-referenced documents describe how to do this. Revoking a set of keys effectively renders the compromised device (and any clones thereof) inoperable to play content that is produced after the revocation. Of course, since more than one device can share any particular key with the compromised device, revoking a set of device keys will result in revoking some keys held by innocent devices. When a small number of revocations occur this is not a problem, however, since only one key in a set is required for decryption, and it will be recalled that the chances that an innocent device shares an entire set of keys with any other device is very small. Accordingly, it is unlikely that revoking the set of keys of a compromised device will result in rendering an innocent device unable to decrypt content.

Nonetheless, as understood by the present invention it remains desirable that key overlap between devices remain small, because after potentially many compromised key set revocations, the chances of disabling/rendering useless an innocent device grow. Furthermore, it is desirable that the chance of any two devices having exactly the same set of keys is not only small, but approaches (or in fact is) zero, to altogether eliminate the possibility of debilitating an innocent device with a single revocation of a set of compromised keys. Moreover, as intimated above it is possible that the total number of key sets used in the system might approach one billion or more (since a billion or more devices might be manufactured). The present invention appreciates that when the number of device key sets approaches this magnitude, storing and accessing keys can require complex data storage structures. The present invention has made the critical observations noted above and has provided the below solutions to one or more of the observations.

SUMMARY OF THE INVENTION

The invention includes a computer system for undertaking the inventive logic set forth herein. The invention can also be embodied in a computer program product that stores the present logic and that can be accessed by a processor to execute the logic. Also, the invention is a computer-implemented method that follows the logic disclosed below.

A method is disclosed for defining sets of encryption keys from a key matrix. The method includes receiving parameters representing characteristics (such as the number of rows and columns) of the key matrix, and, using the parameters and an error-correcting code such as but not limited to a linear code, defining plural sets of keys. The sets of keys are then assigned to respective player-recorder devices. By "error-correcting code" is meant a non-random function that generates plural sets of keys with a prescribed Hamming distance between every two sets of keys.

In a preferred embodiment, the error-correcting code is a linear code, such as a Reed-Solomon code, and each set of keys represents a set of key indices in the key matrix. Each key index is associated with a respective key.

Preferably, the error-correcting code receives a row parameter "N" representing the number of rows in the key matrix and a column parameter "n" representing the number of columns in the key matrix, and the preferred method further includes using an error-correcting code having a Hamming distance "d" that minimizes key overlap between sets of keys. The error-correcting code defines the sets of keys using a total predefined number "T" of sets.

As set forth in greater detail below, the error-correcting code is associated with a generating function G. The preferred method includes storing the generating function G and an index of a last-defined set of keys, such that no set of keys need be stored. This is because sets of keys other than the last-defined set can be regenerated using the generating function G and the index of the last-defined set. In a preferred embodiment, the error-correcting code is a linear code and its generating function is a generating matrix G.

In one optimization, the generating matrix G can be transformed to have a non-systematic row assignment, i.e., a non-symmetric representation row assignment. In another optimization, the error-correcting code generates vectors over an alphabet having symbols, and the method further includes renaming symbols based on a pseudorandom permutation.

In another aspect, a computer program device includes a computer program storage device that in turn includes a program of instructions which can be used by a computer. The instructions include logic means for defining, based on at least one error-correcting code, plural sets of keys useful by respective devices for decrypting encrypted content.

In yet another aspect, a computer is programmed with instructions to cause the computer to execute a method that includes receiving, as input, at least a number "n" representing a number of columns in a key matrix and a number "N" representing a number of rows in the key matrix. Each position in the key matrix is definable by a respective index, and each index is associated with a respective key that can be used by a decryption device for decrypting encrypted content. The computer defines, based at least in part on the input, plural sets of keys using a non-random function.

The details of the present invention, both as to its structure and operation can best be understood in reference to the accompanying drawings, in which like reference numerals refer to like parts, and in which:

BRIEF DESCRIPTION OF THE DRAWINGS

FIG. 1 is a block diagram of the present system;

FIG. 2 is a flow chart of the overall logic; and

FIG. 3 is a flow chart of key assignment enhancements.

DETAILED DESCRIPTION OF THE PREFERRED EMBODIMENTS

Referring initially to FIG. 1, a system is shown, generally designated 10, for generating sets of keys in a broadcast content guard system, such as but not limited to the system disclosed in the above-referenced patent. By "broadcast" is meant the wide dissemination of a program from a content provider to many users simultaneously over cable (from a satellite source), or wire, or radiofrequency (including from a satellite source), or from widely marketed content disks.

As shown the system 10 includes a key set definition computer 12 that accesses a key set definition module 14 that functions in accordance with disclosure below to define sets of keys chosen from a key matrix 16. As shown, the key matrix 16 has "n" columns and "N" rows, with the number of columns generally being relatively small, e.g., sixteen or thirty two, and the number of rows being relatively large, e.g., perhaps many thousands. In the preferred embodiment, each set of keys defined by the computer 12 includes one and only one key per column, with a set of keys thus equaling "n" keys. The sets defined by the computer 12 are associated with the serial numbers of respective player-recorder devices and provided to the respective devices via, e.g., device manufacturers 18. A player-recorder device can access its key set to decrypt the content on media, again in accordance with the above-referenced patent. As used herein "media" can include but is not limited to DVDs. CDs, hard disk drives, and flash memory devices.

It is to be understood that the processor associated with the module 14 accesses the modules to undertake the logic shown and discussed below, which may be executed by a processor as a series of computer-executable instructions.

The instructions may be contained on a data storage device with a computer readable medium, such as a computer diskette having a computer usable medium with computer readable code elements stored thereon. Or the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled C⁻⁻ compatible code.

Indeed, the flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function acts corresponding to those shown.

The logic of the present invention can be seen in reference to FIGS. 2 and 3. Commencing at block 20 in FIG. 2, parameters of the key matrix 16 are received. In the presently intended embodiment, these parameters include the number "n" of columns and the number "N" of rows. Also, the total number "T" of key sets to be generated is received.

Moving to block 22, a non-random function is used to define sets of keys. In a preferred embodiment, the function is an error-correcting code, such as but not limited to a linear code. In a particularly preferred embodiment, when $N \geq n+1$ the optimum linear code is a Reed-Solomon code. Essentially, the code is a template that generates sets of keys by constructing vectors that achieve the minimum possible overlap between vectors, with each vector representing a respective key set. More specifically, the best code C as a function of $\{n, k, N, d\}$, wherein $k = \log_N T$ and further wherein d is the largest Hamming distance, is used.

When a linear code, specifically a Reed-Solomon code is used, the code uses the above principles, receiving as input at block 24 the numbers $\{1 \ldots T\}$. The code generates N-ary representations of the numbers $\{1, \ldots T\}$, which is output to block 26. Each N-ary representation can be regarded as a vector of length "n" (the number of keys in a set) over the alphabet of $(0, \ldots, N-1)$ (the number of rows).

The present invention recognizes that a linear code has an associated generating function such as a generating matrix G that has k rows, and this generating matrix G can be used to map vectors to codewords in a straightforward way for efficient data storage purposes. Accordingly, in one preferred embodiment the logic next moves to block 26, wherein each vector is mapped to a unique codeword. More particularly, for the integer "j" of the $j^{th}$ vector (i.e., the $j^{th}$ set of keys) having a N-ary (i.e., base N) representation $(b_1, \ldots, b_k)$, the $j^{th}$ vector is mapped to the codeword generated by taking the product of the generating matrix G and the vector $(b_1, \ldots, b_k)$. These codewords are output at state 26, with each representing a set of device keys. It is to be appreciated that each vector represents a set of key indices in the key matrix 16, with each key index being associated with a respective key. All that needs to be stored at block 28 to support future key lookup/add/delete operations is the generating function G and the index (codeword) of the last-defined set of keys (i.e., the last-defined vector), because, since the error-correcting code is deterministic, all previously generated vectors can be regenerated on an as-needed basis from these two inputs. In other words, sets of keys can be regenerated using the generating matrix G and the index of the last-defined set.

Once sets of keys have been generated, the logic proceeds to block 30. At block 30, vectors are associated with respective player-recorder device serial numbers. The keys are then provided to the respective player-recorders in accordance with the above-referenced patent.

It is to be understood that some elective optimizations to the above logic can be implemented if desired. For instance, prior to block 26 the $j^{th}$ index can be pseudorandomly permutated. Specifically, if f(j) is any random permutation of the numbers $(0, \ldots, T)$, then the $j^{th}$ set of device keys (i.e., the $j^{th}$ vector) is assigned to a codeword that is the product of the generating matrix G and the N-ary representation of f(j), instead of j, at block 26. For purposes of the present claims, however, both mappings are covered unless explicitly differentiated. One way to establish f(j) is to select a T'≦T such that (0, . . . , T') forms a finite field, and then find a generator "g" of this field and define $f(t)=g^t$.

Further, as indicated at block 32 of FIG. 3, the codeword alphabet symbols (0, . . . , N−1) can be renamed based on a random permutation. If desired, a different renaming permutation can be used for every column or group of columns, to make any overlap between groups of columns less obvious to potential hackers.

Also, if desired, at block 34 any systematic representation of the generating matrix G can be transformed using row operations to produce a matrix or matrices that are equivalent, but that have the property that sequential row assignments have entirely different rows in each column. In other words, at block 34 the generating matrix G can be transformed to have a non-systematic row assignment, such that information about the error-correcting code that the use of a systematic matrix G might otherwise reveal to a hacker is concealed.

While the particular METHOD FOR ASSIGNING ENCRYPTION KEYS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one", not "only one", unless otherwise stated in the claim. All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

We claim:

1. A method for defining sets of encryption keys from a key matrix, comprising: receiving at least one parameter representing a characteristic of the key matrix; using the parameter and an error-correcting code, defining plural sets of keys; and assigning at least some sets of keys to at least some respective devices, wherein the receiving act includes receiving at least a row parameter "N" representing the number of rows in the key matrix and a column parameter "n" rep resenting the number of columns in the key matrix, and the method further includes: using an error-correcting code having a Hamming distance "d" that minimizes key overlap between sets of keys.

2. The method of claim 1, wherein the error-correcting code is a Reed-Solomon code.

3. The method of claim 1, wherein each set of keys represents a set of key indices in the key matrix, each key index being associated with a respective key.

4. The method of claim 1, wherein the error-correcting code defines the sets of keys using a total predefined number "T" of sets.

5. The method of claim 1, wherein the error-correcting code is associated with a compact generating function and the method further comprises storing the compact generating function and an index of one and only one stored set of keys, whereby no set of keys other than the index of the stored set of keys need be stored in that sets of keys can be regenerated using the compact generating function and the index of the stored set.

6. The method of claim 5, wherein the compact generating function is a generating matrix G, and the method further comprises transforming the compact generating function G to have a non-systematic row Assignment.

7. The method of claim 1, wherein the error-correcting code generates vectors over an alphabet having symbols, and the method further comprises renaming at least one symbol based on a pseudorandom permutation.

8. The method of claim 1, wherein the error-correcting code is a linear code.

9. A computer program device, comprising:
a computer program storage device including a program of instructions usable by a computer, comprising:
logic means for defining, based on at least one error-correcting code, plural sets of keys useful by respective devices for decrypting encrypted content, wherein the means for defining includes;
logic means for receiving at least a row parameter "N" representing the number of rows in the key matrix and a column parameter "n" representing the number of columns in the key matrix;
logic means for using an error-correcting code having a Hamming distance "d" that minimizes key overlap between sets of keys.

10. The device of claim 9, wherein each set represents a set of coordinates in a key matrix.

11. The device of claim 9, further comprising logic means for associating plural sets of keys with respective devices.

12. The device of claim 9, wherein the error-correcting code is a Reed-Solomon code.

13. The device of claim 9, wherein the error-correcting code defines the sets of keys using a total predefined number "T" of sets.

14. The device of claim 9, wherein the error-correcting code is associated with a compact generating function, and the device further comprises logic means for storing the compact generating function and an index of a stored set of keys, whereby no sets of keys need be stored in that sets of keys can be regenerated using the compact generating function and the index of the stored set.

15. The device of claim 14, wherein the compact generating function is a generating matrix G, and the device further comprises logic means for transforming the generating matrix G to have a non-systematic row assignment.

16. The device of claim 9, wherein the error-correcting code generates vectors over an alphabet having symbols, and the device further comprises logic means for renaming at least one symbol based on a pseudorandom permutation.

17. The device of claim 9, wherein the error-correcting code is a linear code.

18. A computer programmed with instructions to cause the computer to execute method acts including: receiving, as input, at least a number "n" representing a number of columns in a key matrix and a number "N" representing a number of rows in the key matrix, each position in the key matrix being definable by a respective index, each index being associated with a respective key useful by a decryption device for decrypting encrypted content; defining, based at least in part on the input, plural sets of keys using a non-random function, wherein the error-correcting code is associated with a generating matrix G, and the method executed by the computer further comprises storing the generating matrix G and an index of a stored set of keys, whereby no set of keys other than the index of the stored set of keys need be stored in that sets of keys can be regenerated using the generating matrix G and the index of the stored set.

19. The computer of claim 18, wherein the non-random function is an error-correcting code.

20. The computer of claim 19, wherein the error-correcting code is a Reed-Solomon code.

21. The computer of claim 19, wherein the error-correcting code is a linear code.

22. The computer of claim 18, wherein the method executed by the computer further includes assigning at least some sets of keys to at least some respective devices.

23. The computer of claim 18, wherein the method executed by the computer further comprises transforming the generating matrix G to have a non-systematic row assignment.

24. The computer of claim 18, wherein the error-correcting code generates vectors over an alphabet having symbols, and the method executed by the computer includes renaming at least one symbol based on a pseudorandom permutation.

* * * * *